Nov. 12, 1968   J. G. WILLIAMS   3,410,565
CENTRIFUGAL AND FACE CONTACT SEAL
Filed July 27, 1966   3 Sheets-Sheet 1

JOHN G. WILLIAMS
INVENTOR.

BY Daniel H. Bobis
Atty

Nov. 12, 1968 J. G. WILLIAMS 3,410,565
CENTRIFUGAL AND FACE CONTACT SEAL
Filed July 27, 1966 3 Sheets-Sheet 2

JOHN G. WILLIAMS
INVENTOR.

BY Daniel H. Bobis
Atty

Nov. 12, 1968    J. G. WILLIAMS    3,410,565
CENTRIFUGAL AND FACE CONTACT SEAL
Filed July 27, 1966    3 Sheets-Sheet 3

FORCE $37 = \dfrac{C}{D^2} \displaystyle\int_{D_1}^{D_2} \dfrac{\pi}{2} D\,dD + \left(P_{eye} \times \dfrac{A_{44}}{2}\right)$ WHERE P AT ANY POINT ON THE RADIUS $\sim \dfrac{C}{D^2}$ FORCE $36 = K_{spring} + (P_{eye} \times A_{36})$

JOHN G. WILLIAMS
INVENTOR.

BY Daniel H. Bobis
Atty.

United States Patent Office 3,410,565
Patented Nov. 12, 1968

3,410,565
CENTRIFUGAL AND FACE CONTACT SEAL
John G. Williams, Warren Township, Somerset County, N.J., assignor to Worthington Corporation, Harrison, N.J., a corporation of Delaware
Filed July 27, 1966, Ser. No. 568,267
7 Claims. (Cl. 277—3)

ABSTRACT OF THE DISCLOSURE

In a rotary device for handling fluid under pressure, including a shaft rotatably mounted therein, a mechanical seal is provided to prevent leakage across said shaft including a rotatable element and a stationary element, wherein the stationary element is adjustable for axial movement relative to the rotatable element and is responsive to changing differential pressure forces established axially across it.

---

This invention relates generally to mechanical shaft seals for use with equipment handling fluid under pressure and more particularly, to a combined face contact and centrifugal seal which utilizes both static and dynamic differential pressure balancing to provide an improved seal for high speed shafts.

In systems for circulating fluid under pressure, mechanical seals are used to prevent leakage across the shaft of the prime mover between the region of high pressure and the region of atmospheric pressure. In systems where the prime mover is a motor-driven centrifugal pump, a recent trend in the art has been to drive the pump at increasingly higher speeds. Thus, while a decade ago speeds of 3600 r.p.m. were common, today speeds of 10,000 r.p.m. are commonplace. The principle difficulty encountered in sealing high speed shafts is to provide a shaft seal which can operate from zero to high speed with substantially zero wear.

Various types of mechanical seals are known in the prior art. For example, the conventional face contact type mechanical seals include a rotatable element and a stationary element which physically contact one another, resulting in wear and finally, mechanical breakdown. These seals work well, however, at low speeds, but are subject to severe wear problems at high speeds.

Another type of seal known in the prior art is the centrifugal liquid-barrier seal which utilizes centrifugal force to hold a liquid in the curved portion of "U" shaped structure. This type of mechanical seal is not subject to wear at all, since there are no physically contacting parts. But its effectiveness as a seal depends on shaft rotation to keep the fluid spinning, and thus, while it is effective at high speeds, sealing is most difficult at startup and at slow speeds.

The present invention optimises the advantages of both types of seals, while eliminating their disadvantages. It combines a face contact seal and a centrifugal seal to achieve minimal wear from zero to normal operating speed.

The present invention covers a mechanical seal which includes a rotatable element and a stationary element, which latter element is adjustable for axial movement relative to the rotatable element and is responsive to changing differential pressure forces established axially across it, which changes and adjustments are a function of the speed and configuration of the rotating element as well as the disposition of the means for distributing the forces over the stationary element, which means include a spring and passage means communicating the high pressure side of the seal with an expandable chamber formed in the adjustable stationary element.

Thus, this device effects sealing when the shaft is stationary by utilizing static fluid pressure balance plus spring force to cause the rotatable element and the stationary element to physically contact. When the shaft is rotating, the rotatable element of the seal creates a pressure gradient over the face contact portion of the stationary element thereby causing a dynamic fluid pressure imbalance to act axially between the face contact portion of the stationary element and that portion of the adjustable stationary element forming a wall of the expandable chamber; which pressure imbalance causes the face contact portion to disengage as the shaft approaches operating speed and allows the centrifugal field generated by the rotatable element to establish a dynamic differential pressure balance across the seal, to prevent leakage of fluid across the shaft from the high pressure side to the low pressure side of the seal, without contact between the stationary and moving parts at high operating speeds.

For reasons which will be more fully explained hereinafter, it is desirable to have a plurality of rotating elements, rather than just one, to effect a centrifugal seal during operation. However, the fact contact function of the seal does not require a plurality of rotating elements, and therefore, there need be only one adjustable stationary element to perform this function.

Accordingly, it is an object of this invention to provide a mechanical shaft seal in a high pressure fluid handling apparatus, wherein the shaft is operated at high speeds, which seal will prevent leakage across the shaft between the area of high pressure and the area of low pressure while virtually eliminating wear by an optomized combination of a face contact seal and a centrifugal seal.

It is another object of this invention to provide a face contact and centrifugal shaft seal which is maintained clean and free from impurities contained in the fluid of the prime mover being driven by the shaft about which the seal is mounted.

It is another object of this invention to provide a new and novel centrifugal seal system.

It is the further object of this invention to provide a new and novel statically balanced face contact seal.

Still another object of this invention is to provide a highly efficient mechanical seal for high speed shafts.

These and other objects and advantages of this invention will become apparent from the following description with reference to the accompanying drawings in which.

Figure 1:
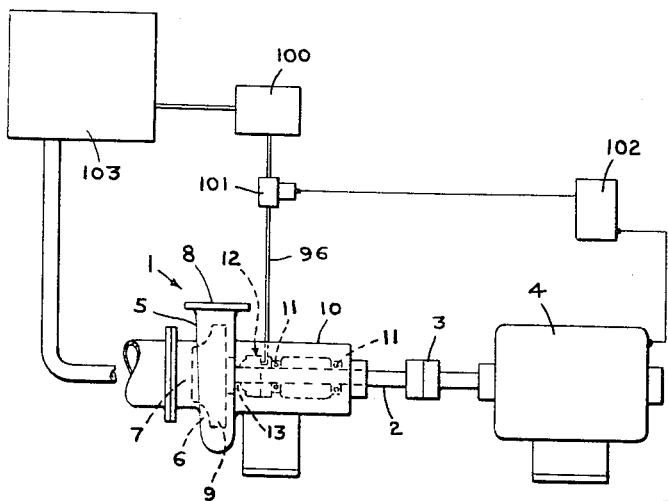
FIGURE 1 is a schematic diagram of a pumping system showing the mechanical seal, as an embodiment of this invention, disposed about a shaft in operative association with a pump housing.

Referring to the figures, FIGURE 1 shows a centrifugal pump 1 connected by means of a shaft 2 and a coupling 3 to a high speed motor 4. The casing 5 of the pump forms an impeller chamber 6 having a centrally disposed suction inlet 7 and a discharge outlet 8. An impeller 9 is mounted for rotation within this casing on the shaft 2, which extends through the pump bearing housing 10 and is supported therein by the bearings 11.

A seal housing 12 is formed integral with the casing 5. The seal housing 12 has a hollow cylindrical shape which forms a seal chamber which communicates with and receives fluid from the impeller chamber 6 as hereinafter described. The shaft 2 extends through this seal chamber.

Impeller chamber 6 is filled at all times with fluid maintained at a relatively constant static pressure from fluid source 103. Depending upon certain design parameters well known in the art, this pressure can be quite high, such as 500 p.s.i. The passage 13 which communicates the impeller chamber 6 with the seal chamber is likewise filled with the same fluid at the same static pressure. This pressure is the suction pressure which is about the same both before and during operation of the pump 1.

Since the shaft 2 enters the impeller chamber 6 from a point at atmospheric pressure or at least a relatively lower pressure than the pressure of the fluid in the impeller chamber 6, leakage could normally occur through the clearance between the shaft and the adjacent close fitting portion of the casing 5 from the zone of high pressure fluid, by reason of the differential pressure that exists.

The present invention eliminates this leakage by providing a statically balanced face contact seal when the shaft is stationary, and a centrifugal seal which establishes a dynamic pressure balance across the shaft when the shaft is rotating.

Figure 2:
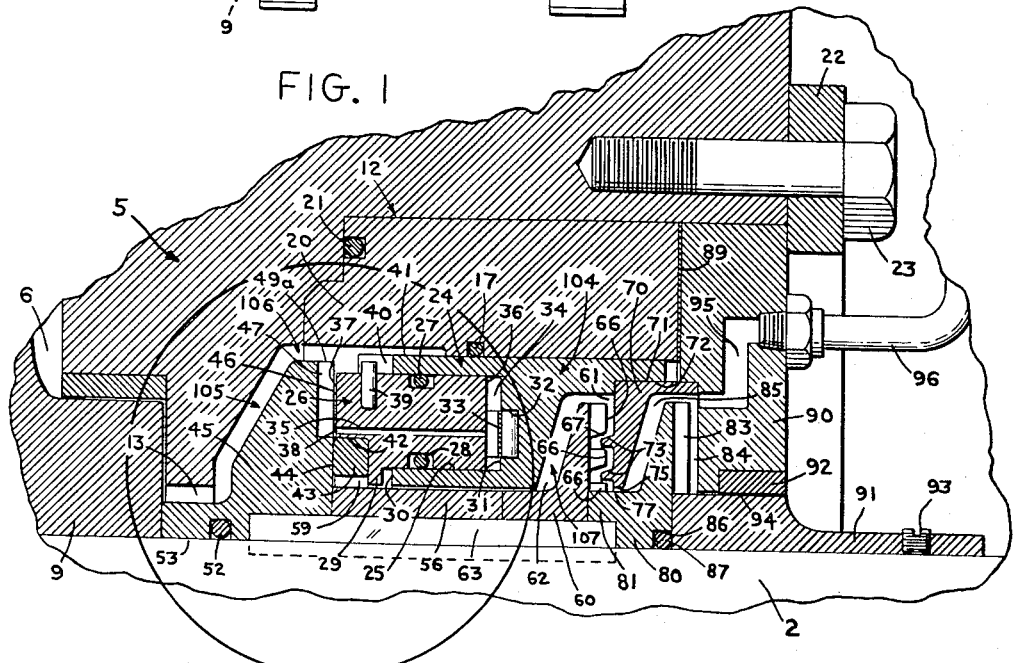
FIGURE 2 is an elevation in cross section of the mechanical seal shown in FIGURE 1.

Referring to FIGURE 2 the mechanical seal is shown in detail. The seal comprises an outer housing 20 which serves to mount the stationary parts of the seal in the seal housing 12. An O ring 21 is provided to prevent leakage between this outer housing 20 of the seal and the seal housing 12. A shim 89 is provided for adjustment purposes between the outer housing 20 and the cover member 90. The outer housing 20 is maintained in engagement with the seal housing 12 by means of the retaining member 22 and the bolts 23 which are suitably spaced around the retaining member 22 for engagement with the seal housing 12. The portion of the pump casing 5 adjacent to the outer housing 20, together with the outer housing 20 and the cover member 90, form the seal chamber, designated generally as 105. This chamber is divided into an inner portion 106 and an outer portion 107 by means of the stationary element 104.

The face contact seal, forming a part of the present invention, lies within the inner portion 106 of the seal chamber 105.

Face contact seal

Referring to FIGURE 2, we find the stationary element 104 which comprises an adjustable stator 26 and a stator housing 24. The stator housing 24 is fastened to the outer housing 20 of the seal. The O ring 17 prevents leakage therebetween from the inner portion 106 of the seal chamber 105. Stator housing 24 has an annular recess 25 therein for retaining the annular adjustable stator 26.

The stator 26 is slideably mounted in the annular recess 25 and is in contact therewith. Inner and outer circumferential O rings 27 and 28 respectively, are used for effecting a sliding seal between the adjacent contacting surfaces of the stator 26 and the annular recess 25. The stator 26 has an annular inner lip 29 which will engage the annular inner edge 30 of the recess 25 in the stator housing 24 and prevent the stator 26 from further penetrating the annular recess 25 in the stator housing as the stator 26 is moved from left to right (as more clearly shown in FIGURE 3).

Since the width W of the stator is less than the depth of the annular recess, from the annular inner edge 30 to the bottom 31 of the annular recess 25 indicated by W', there is always a clearance space C between the bottom 31 of the recess, and the right radial face 36 of the stator 26.

The stator 26 has a plurality of passage means 35 axially disposed therethrough and circumferentially spaced from each other and radially equidistant from the axis of the annular stator; which axis coincides with the center line of the shaft 2. These passage means communicate the inner chamber 106 with chamber 34 formed between the right radial face 36 of the stator 26, the bottom 31 of the annular recess 25, and the sides of the annular recess 25. Since the clearance space C always exists, the chamber 34 will likewise always be in existence and therefore, the right radial face 36 of the stator 26 will always be acted upon by fluid from chamber 106 which has passed through the axial passage means 35.

Figure 9:
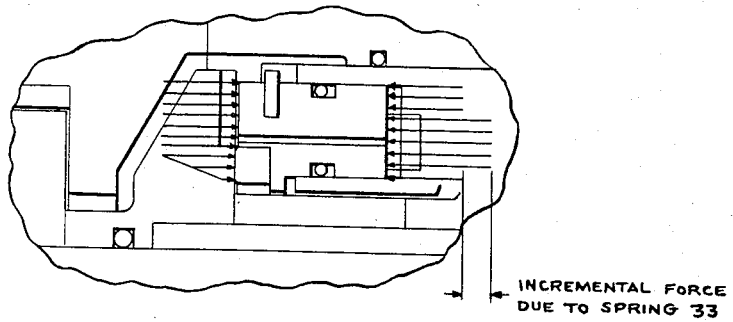
FIGURE 9 is a force diagram showing the static forces acting on the adjustable stator portion of the seal.

The radial faces 36 and 37 of the stator 26 are designed so that the static pressure exerted by fluid in the inner chamber 106, which acts on the left radial face 37 of the slidable stator, will be less than the pressure on the right radial face 36. (As shown by the force diagram FIGURE 9.) Note that fluid pressure also exists across the nose 44 of the face contact seal, due to leakage; which leakage is negligible, since it is on the order of a quantity which will readily evaporate. The linear pressure gradient here is due to the laminar flow regime for this leakage fluid. Thus the adjustable stator 26 is slightly biased to the left by force balance when the shaft is stationary or rotating at low speeds.

In the bottom 31 of the annular groove 25 there is a second annular groove 32 for retaining an annular leaf spring 33. This spring is disposed to maintain a force against the right radial face 36 of the stator 26. See FIGURES 2 and 3. This force serves to effect sealing (as more fully described hereinafter) when the pump is not running. It is depicted in the force diagram FIGURE 9 as the additional constant static force which is distributed over the center portion of the right radial face 36 of the stator 26.

The actual face contact sealing occurs between the ring 43 and the rotatable element or rotor 45. The rotor 45 is keyed for rotation to the shaft 2 by means of the key 63, and may be locked in axial position in any conventional manner. An O ring 52 is provided between the inner bore 53 of the first rotor 45 and the shaft 2 to prevent leakage along the shaft 2 from the impeller chamber 6.

Figure 4:
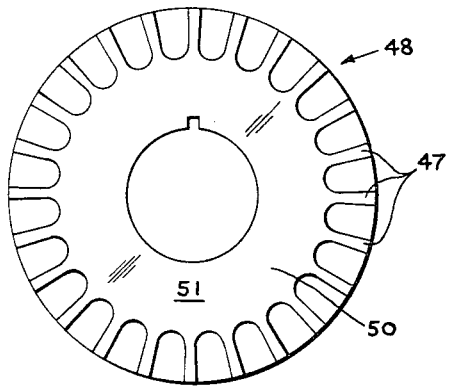
FIGURE 4 is a face view of the first rotor on the left shown in FIGURE 2.
Figure 5:
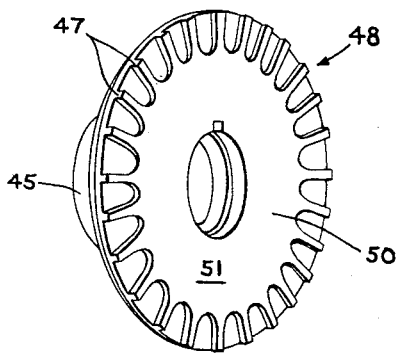
FIGURE 5 is a perspective view of the rotor shown in FIGURE 4.

The ring 43, which is made of carbon or other suitable low friction material, is mounted on the adjustable stator 26 in the annular notch 42. The ring has a nose portion 44 which protrudes axially to the left beyond the left radial face 37 of the stator 26, and is disposed so that the nose portion 44 will contact the right radial face 50 (FIGURES 3, 4, and 5) of the first annular rotor 45, when the stator 26 has moved axially from right to left, under the combined influence of the spring and pressure forces, as in FIGURE 2; thereby forming a face contact mechanical seal with the rotor 45 and leaving a clearance space 46 between the blades 47 of the rotor 45 and the left radial face 37 of the stator 26. This clearance space allows the fluid in the inner chamber 106 to be in contact with and exert a force on the full radial face 37 of the stator 26.

Centrifugal seal

The centrifugal seal comprises at least one rotatable member. In the embodiment to be described, three rotatable elements are used, for reasons which will be more fully described hereinafter. (See FIGURE 2.) The first rotatable element or rotor 45 is disposed in the inner portion 106 of the seal chamber 105. As more clearly shown in FIGURES 4 and 5, the lower portion 50 of the radial face 51 of the rotor 45 is smooth and is disposed so as to be perpendicular to the center line of the shaft 2 for accurate, close sealing engagement with the nose portion 44 of the ring 43, as previously described. The outer circumferential portion of the radial face 50 contains a plurality of radially extending blades 47, which form the centrifugal impeller 48.

The eye 49 (FIGURE 3) of this impeller is juxtaposed with the openings 38 of the axial passage means 35, so that when the impeller is rotating, the pressure of the fluid in the chamber 34, having been transmitted through the passage means 35, will be the same as the pressure at the eye 49.

Figure 10:
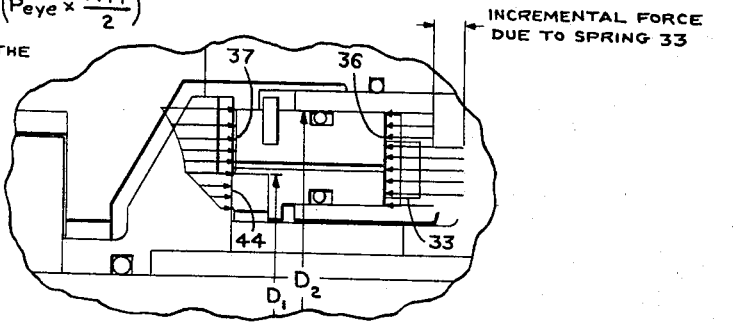
FIGURE 10 is a force diagram showing the start-up and early operational dynamic forces acting on the stator.
Figure 11:
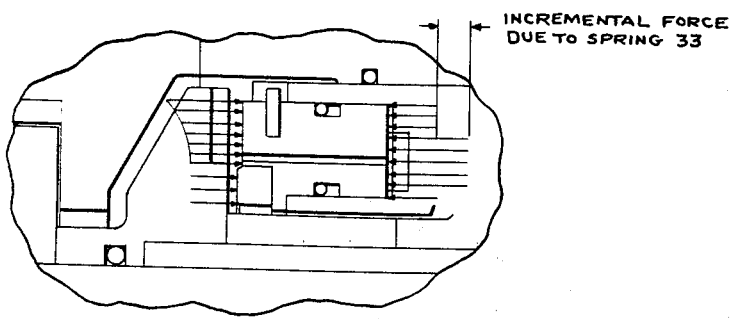
FIGURE 11 is a force diagram showing the forces acting on the stator at normal shaft speed.

During the operation of the pump 1, as will be more fully described, the rotating shaft 2 drives the rotor 45, and the impeller 48 formed thereon, thereby causing a pressure gradient to exist between the eye 49 of the impeller 48 and its peripheral tip 49a. As shown in the force diagram FIGURE 10, a pressure gradient will exist across the left radial face 37 of the stator 26, while a constant force will exist across the right radial face 36. This difference in axial forces will cause the adjustable stator 26 to slide axially from left to right in the annular groove 25, as the shaft approaches operating speed, thereby disengaging the nose portion 44 of the ring 43 from the rotor 45. (See FIGURES 3 and 11.) To prevent the stator from rotating within the stator housing, as it moves axially in the annular groove 25, a guide pin 39 is disposed in the stator 26 and in engagement with an axial slot 40 in the annular outer edge 41 of the stator housing 24.

Any fluid leaking through this opening between the nose portion and the rotor will enter the passage 59 between the outer circumferential surface of the spacer bushing 56 (FIGURE 2) and the stationary element 104. The spacer bushing 56 is disposed between the first annular rotor 45 and the second annular rotor 60, and is keyed to the shaft 2 by means of the key 63. The passage 59 communicates the inner portion 106 of the seal chamber 105 with the outer portion 107.

Depending on the size of first rotor 45, the outer portion 107 of the seal chamber may contain one or more additional rotors. If, for example, the first rotor 45 were large enough so that it could develop sufficient head to equal or better the suction pressure of the fluid in the impeller chamber 6, which fluid is communicating with the inner portion 106 of the seal chamber 105 by means of clearance passage 13 along the shaft 2, then there would be no need for additional rotors, since the leakage would effectively be prevented by the single rotor establishing a dynamic pressure balance. A plurality of smaller rotors are preferred, however, because they, in combination, use less power than a single large rotor. Also they take up less radial space and exhibit good flooding characteristics in the pumping chambers (as will be more fully described), so as to more effectively prevent leakage.

The diameter of the rotors is very important on startup and shutdown of the pumping operation, during which time the face contact seal will be subjected to wear.

Wear is a function of $pV$, i.e. the pressure $p$ exerted between contacting mechanical parts and the velocity $V$ at which the parts are rotating with respect to one another. The wear usually is excessive in face contact mechanical seals which rotate at high speeds, since the $V$ is a high figure. This normally is true even where the pressure $p$ is small.

While it is true that there is disengagement of the face contact portion of the seal after operating speed has been reached, there is nevertheless a necessity for having the face contact portion in operative sealing contact with the rotating portion of the seal, to provide leakage at less than operating speeds. The reason is that the fluid dynamic seal portion of the mechanical seal will not have attained the requisite pressure differential across the rotating members to exactly balance the fluid pressure in the passage 13, until the operating speed is reached. Thus the nose portion 44 will remain in contact with the rotor 45 while the shaft is rotating, until the requisite axial imbalance of pressure will depress the leaf spring and allow the adjustable stator 26 to move to the right. While the nose portion of the carbon ring is in contact with the radial face of the first rotor, it will be subjected to wear. The velocity $V$ will be low, but the pressure $p$ forcing the seal to remain in physical contact, will be at least as great as the force of the spring needed to prevent fluid in the passage 13 from leaking passed the seal. Since the $p$ value cannot be significantly reduced during startup, the smaller the radius between the centerline of the shaft and the point of contact of the seal faces, the better from a standpoint of wear, because of a small radius means a small peripheral velocity. Therefore, the smallest practical diameters have been used both on the rotors and the carbon ring.

It should be emphasized, however, that the actual period of time during which the face contact portion of the seal is operating while the shaft is rotating, is very small, being on the order of a few seconds. During this time the shaft is rotating at less than operating speed as previously indicated. These two factors i.e. short time and low speed, also combine to keep the wear on the physically contacting parts to a minimum.

As many rotors as are necessary, should be used to produce a pressure head, equal to the pressure in the passage 13, from the peripheral tip of the first rotor 45 to the eye of the most remote rotor in the outer portion 107 of the seal chamber 105. In the present invention, two additional rotors will be described.

Figure 6:
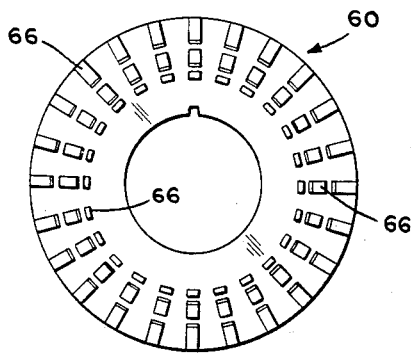
FIGURE 6 is a face view of the rotor in the middle shown in FIGURE 2.

The second rotor 60 is disposed in the outer portion 107. It is keyed for rotation to the shaft 2 by means of key 63. The rotor is axially and radially spaced from the stator housing 24, so that there is formed therebetween a discharge passage 62, which communicates with the passage 59. The outer portion of the right radial face of the rotor 60 contains a plurality of circumferentially spaced, radially extending, segmented blades 66. (FIGURES 2 and 6.) The blade configuration shown is similar to that shown in the ASME publication: paper number 63–WA–167, Centrifugal Types of Dynamic Shaft Seals, by G. M. Wood, D. V. Manfredi, and J. E. Cygnor, The American Society of Mechanical Engineers, 345 E. 47th Street, New York 17, New York, 1963, page 4, FIGURE 3 (DS–8). This impeller design is utilized in the preferred embodiment of this invention to obtain the characteristics of performance, as more fully described hereinafter and in the ASME paper referred to above, although any centrifugal impeller design could be used containing any blade configuration including any of the other types described in the referenced ASME paper or otherwise well known in the prior art.

Figure 7:
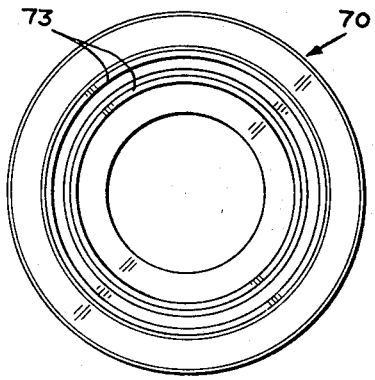
FIGURE 7 is a face view of the diaphragm shown in FIGURE 2 between the middle rotor and the rotor on the right.

A diaphragm member 70 is fixedly connected along its outer circumferential surface 71 in sealed engagement with the inner annular recess 72 in the stator housing 24. This diaphragm member is axially spaced from the second rotor 60, so that there is formed therebetween a pumping chamber 61. As shown in FIGURES 2 and 7, the diaphragm has protruding from its left radial face a plurality of annular tangs 73 which are designed to mate with the segmented blades 66 of the second annular rotor 60; there being a labyrinthine clearance space 67 between the tangs 73 and the segmented blades 66 in the pumping chamber 61. The inner bore 75 of the diaphragm member 70 is radially spaced from the hub 81 of the third rotor 80, forming thereby an inlet passage 77 which communicates with the pumping chamber 61.

Figure 8:
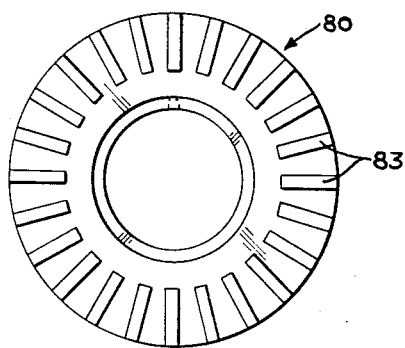
FIGURE 8 is a face view of the rotor on the right shown in FIGURE 2.

A third rotor 80 is disposed in the outer chamber 107, and is keyed for rotation to the shaft 2 by means of the key 63. The right radial face of the rotor 80 contains a plurality of radially extending blades 83. (FIGURES 2 and 8.) The third rotor 80 is disposed in spaced relation with the diaphragm member 70 and the cover member 90 to form thereby a pumping chamber 84 and a discharge passage 85, which communicate with the inlet passage 77. The inner bore 86 embraces an "O" ring 87 to prevent leakage along the shaft 2 to the atmosphere.

The cover member 90 contains passage means 95 therethrough which communicate the pumping chamber 84 with a source of cooled filtered fluid 100, (FIGURE 1) through conduit means 96. The cooler 100 may be connected to the same source 3 of fluid as the pump 1, as shown in FIGURE 1. The solenoid valve 101 controls the flow of cool fluid from the cooler 100 to the cover member 90, and is itself controlled by the pump and motor controls 102. This arrangement permits fluid to flood the outer portion 107 of the seal chamber 105 upon startup of the pump 1, so that the rotors in the outer chamber will begin immediately to produce a dynamic fluid pressure and will continue to produce this head, as further described below in connection with the operation.

Also, on shut-down of the pump, the solenoid valve 101 controlling the cooling fluid will close and prevent further leakage of cooling fluid into the pumping chamber 84.

A sleeve 91 is disposed about the shaft 2, and as shown in FIGURE 2, bears against the third rotor 80 to maintain the rotating parts of the seal in fixed axial relation to each other and to the stationary parts. A set screw 93 prevents axial movement of the sleeve with respect to the shaft 2. A restricted radial clearance space 94 is provided between the sleeve 91 and the wearing ring 92 of the cover member 90; which space communicates the pumping chamber 84 with the atmosphere.

*Operation of the combined mechanical seal*

When the pump 1 and motor 4 are not operating there is nevertheless a static head or pressure in the impeller chamber 6 as previously described. This is the suction pressure of the pump 1 and is generally considered to be a constant, as it is a function of the source 103 of the pressure fluid to the pump. This static suction pressure is transmitted through the passage 13 to the inner portion 106 of the seal chamber 105. The seal, as previously described, is designed to allow this pressure fluid to act on both radial faces 36 and 37 of the adjustable stator 26, causing thereby a nearly equal and opposite pressure to exist on these faces. Since the stator 26 is only slightly biased to the left by the static pressure balance, essentially this residual imbalance due to static pressure plus the force of the leaf spring 33 will act against the stator to force the nose portion 44 of the carbon sealing ring 43 against smooth radial face 50 of the first rotor 45, causing thereby an effective face contact mechanical seal to prevent leakage from the passage 13 along the shaft 2. The "O" rings 21 and 52 prevent leakage from the passage 13 around the seal, either between the outer housing 20 and the pump casing 5 or rotor 45 and the shaft 2.

When the motor 4 driving the pump 1 is started, the pump shaft 2 begins to rotate. During startup its rotation is relatively slow and the face contact mechanical seal continues to function under the force exerted by the leaf spring and residual static pressure force imbalance. However, as the speed of the rotating shaft increases the blades 47 of the first rotor begin to act as an impeller. The suction pressure is constant in the passage 13, and therefore the pressure at the peripheral tip 49a of the blades 47 of the first rotor will also remain constant. Since this impeller portion 48 (FIGURE 5) acts as a centrifugal impeller, the operating pressure at the eye 49 (FIGURE 3) of the impeller will be substantially less than the operating pressure at the peripheral tip. Therefore, since the pressure at the tip is maintained constant during operation, the pressure at the eye will have to be somewhat less. In effect, by maintaining the pressure at the peripheral tip 49a of the impeller 48, the device will produce essentially the same pressure gradient radially over the blades as a centrifugal impeller would produce. Consequently, the pressure at the eye 49 of the impeller is reduced because the differential pressure between the tip 49a and eye 49 is a direct function of the geometry of impeller 45, the speed of rotation, and the density of the fluid being sealed. (See FIGURE 10.)

Since the eye of the impeller is in communication with the rear face 36 of the stator 26 by means of the axial passages 35 therethrough, the pressure acting on this rear face will be the same as the pressure at the eye 49 of the impeller, and will, therefore, likewise be reduced from the value of the static suction pressure prior to rotation to the value of the operating pressure at the eye. (Compare FIGURE 10 with FIGURE 9.)

Figure 3:
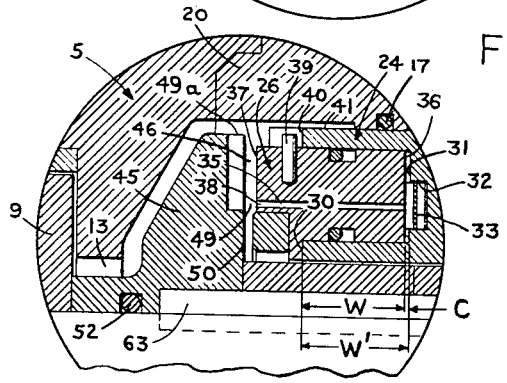
FIGURE 3 is a detail of that portion of the seal encircled in FIGURE 2, showing the position of the parts of the seal when the shaft is rotating at operating speed.

The pressure acting radially across the left radial face 37 of the stator 26 will not be uniform. Rather there will be a pressure gradient acting across this face between the eye of the impeller and the tip of the impeller. As normal operating speed is approached a greater fluid force will be exerted on the left radial face 27 than will be exerted on the right radial face 36 as shown in force diagram FIGURE 10. When the difference between the pressure fluid force exerted on the left radial face 37 and that exerted on the right radial face 36 becomes greater than the static force exerted by the annular leaf spring 33, there will exist an axial force imbalance on the stator 26 which will cause the stator to move axially to the right (See FIGURE 1). This motion will remove the nose portion 44 from contact with the first rotor 45 thereby disengaging the face contact portion of the mechanical seal and allowing fluid to leak pass the face contact portion into passage 59. (FIGURE 3.)

Simultaneously with the startup of the motor 4, the solenoid valve 101 will open, allowing fluid from the cooler 100 to pass through the conduit means 96 and the passage means 95 in the cover member 90, into the pumping chamber 84. The second and third rotors 60 and 80, which have been keyed to the shaft for rotation as previously described, will not act as pumping means and pump this cool fluid from the cooler 100 toward the stator 26.

The operation of all three rotors results in a pressure drop from the suction pressure of the main pumping means, to atmospheric pressure. The opening to the atmosphere is provided by the clearance space 94. As many rotor stages as necessary can be provided to produce this pressure drop. The differential pressure that exists will be across the group of rotors from the tip of the first rotor to some point on one of the rotors in the outer chamber 107 at which the air under atmospheric pressure interfaces with the cool fluid being pumped. This point could be the eye of the most remote impeller in chamber 107. However, tests have shown that this juncture is generally produced irregularly on the face of one of the impellers. These irregular interface patterns are more clearly shown in the referenced ASME article. Test results indicate that these irregular patterns are inefficient, and therefore, the impeller design of rotor 60, previously described as being the most preferred, is utilized in the present invention, because it produces a uniform air-fluid interface, which results in maximum efficiency and lower energy consumption as fully described in the referenced ASME publication.

A cooler 100 is used to cool the fluid being pumped, in order to maintain the air-fluid interface below the boiling point at atmospheric pressure of the fluid being pumped in the outer chamber 107. This prevents fluid from boiling off and escaping into the atmosphere, and then recondensing in the bearings 11. This cooling effect is necessary because some of the energy imparted to the fluid by the rotors will be converted into heat.

As previously described, there are clearances between all the moving parts and the stationary parts, and consequently no physical rubbing nor wear will occur, whether the rotors are running dry or wet.

When the pump is shut-down, the speed of the shaft decreases and likewise the speed of the rotors in the seal decreases. Consequently, the pumping action of the rotors is no longer sufficient to provide the head necessary to balance the suction pressure in the passage 13. However, as the operating speed drips off, so does the differential pressure between the eye 49 and the tip 49a of the impeller blades of the first rotor 45. This results in corresponding reduction in the pressure gradient across the radial face 37 of the stator 26. When the force of the leaf spring 33 and the pressure force from fluid in the chamber 34 exceeds the dynamic fluid force of the pressure fluid in space 46 (FIGURE 2) the stator 26 slides to the left until the nose portion 44 of the ring 43 again effects a face contact seal with the rotor 45. This will occur while the shaft is still rotating (as shown by the force diagrams figures and as previously described in connection with the start-up operation) and will, therefore, prevent an excessive amount of fluid from leaking passed the seal during that part of the shutdown cycle when the fluid dynamic portion of the seal is not completely effective.

When the shaft first begins to rotate and attain operating speed and the face contact portion disengages from the first rotor, fluid will leak past the face contact seal in a direction from left to right along the shaft. As operating speed is reached, the pumping head from the second and third rotors will have increased sufficiently to have pumped sufficient fluid from right to left through the passageways, that fluid will now flow from right to left across the entire group of rotating members. In effect, the direction of fluid flow will be reversed and fluid will leak back into the passage 13 from the seal chamber 105. The disposition of the stator 26 and carbon ring 43 in relation to this operating fluid flow is particularly advantageous, since the cooled fluid, having been filtered and cleaned in the cooler 100, will clear away any impurities from the mating faces of the face contact portion of the seal, so that on shut-down of the pump, when these mating faces again make contact, the sealing effect will be enhanced. Note also that such impurities normally reduce the useful life of close clearance seals, such as face contact mechanical seals.

It will be understood that various changes in the details, materials, and arrangements of parts which have been herein described and illustrated in order to explain the nature of the invention may be made by those skilled in the art within the principle and scope of the invention as expressed in the appended claims.

What is claimed is:

1. A sealing assembly for sealing a high pressure fluid in a high pressure fluid rotating machine having a shaft journaled in a housing, comprising:
   a chamber formed in the housing;
   said shaft disposed to pass through said chamber;
   a stator means disposed within said chamber about said shaft in sealed contact with said housing, said means to divide said chamber to a higher pressure portion and a low pressure portion;
   said stator means comprising a fixed portion being in sealed contact with said housing and a movable portion disposed in said high pressure portion of said chamber and axially movable therein relative to said fixed portion of said stator means;
   chamber means disposed in said stator means between said fixed portion and said movable portion;
   said movable portion of said stator means having parallel radial faces perpendicular to the axis of said shaft and one of said parallel faces having a predetermined area in said high pressure portion of said first mentioned chamber and the other parallel face having a predetermined area forming a wall of said chamber to establish a predetermined force to act axially on said movable portion of said stator means;
   a rotatable element having a radial face perpendicular to the axis of said shaft, mounted on said shaft in said high pressure portion of said chamber, said rotatable element having blade means thereon forming an impeller means having an impeller eye on said radial face thereof adjacent to the movable portion of said stator means for producing a pressure gradient across the adjacent radial face of said movable portion upon rotation of said shaft;
   passage means in said stator means to communicate said chamber means with the high pressure portion of said first mentioned chamber, said passage means disposed to open proximate to the eye of said impeller means whereby on rotation of said shaft an axial force imbalance will be produced across the movable portion of said stator means causing said movable portion to move axially with respect to said fixed portion to disengage thereby said sealing means from said rotatable element;
   sealing means mounted on said stator and in contact with said rotatable element; and
   means disposed between said movable portion and said fixed portion of said stator means and in contact therewith to urge said movable portion toward said rotatable element to maintain thereby said sealing means in contact with said rotatable element to form a seal between said high pressure portion and said low pressure portion of said chamber, under static conditions, and upon startup and shutdown of said rotating machine.

2. A device as in claim 1 wherein:
   fluid supply means connected to said housing and in communication with said low pressure portion of said first mentioned chamber for supplying fluid thereto; and
   an impeller connected to said shaft for rotation therewith and disposed within said low pressure portion of said chamber in operative association therewith for pumping said last mentioned fluid from said low pressure portion to said high pressure portion of said chamber, said impeller and said rotatable element coacting with said fluid to produce therein sufficient pressure to prevent leakage through said seal during operation of said machine.

3. A device as in claim 1 wherein:
   partition means divide said low pressure portion of said chamber into a plurality of communicating pumping chambers;
   a fluid supply means connected to said housing and in communication with the low pressure portion of said chamber for supplying fluid thereto;
   a plurality of impeller means connected to said shaft for rotation therewith and disposed in each of the said pumping chambers in operative association therewith for pumping said last mentioned fluid from the low pressure portion to the high pressure portion of said first mentioned chamber; and
   said impeller means and said rotatable element coacting with said fluid to increase the pressure thereof to prevent leakage through said seal during operation of said machine.

4. A device as in claim 2 wherein said fluid supply means comprises a cooler for suplying cooled filtered fluid to said low pressure portion of said chamber;

5. A device as in claim 2 wherein said impeller having a plurality of circumferentially spaced and radially extending segmented blades thereon, the wall of the low pressure portion of said chamber formed by said housing adjacent to said blades having a plurality of annular tangs formed thereon, said tangs being juxtaposed with said segmented blades to form a labyrinth clearance space therebetween.

6. A device as in claim 3 wherein one of said plurality of impeller means comprises an impeller having a plurality of circumferentially spaced and radially extending segmented blades thereon, and the partition means adjacent the blades of said last mentioned impeller means having a plurality of annular tangs formed thereon, said tangs being juxtaposed with said segmented blades to form a labyrinth clearance space therebetween.

7. A device as in claim 3 wherein said fluid supply means comprises a cooler for supplying cooled filter fluid to said low pressure portion of said chamber.

References Cited

UNITED STATES PATENTS

| | | | |
|---|---|---|---|
| 2,873,986 | 2/1959 | Murray | 277—13 |
| 2,646,999 | 7/1953 | Barske | 277—13 |
| 3,141,677 | 7/1964 | Williams | 277—3 |
| 3,291,489 | 12/1966 | Tracy et al. | 277—23 X |

SAMUEL ROTHBERG, *Primary Examiner.*